(12) United States Patent
Cohen (10) Patent No.: US 9,053,209 B2
(45) Date of Patent: Jun. 9, 2015

(54) SYSTEM, METHOD, AND COMPUTER PROGRAM PRODUCT FOR PERFORMING GRAPH COLORING

(75) Inventor: Jonathan Michael Cohen, Ann Arbor, MI (US)

(73) Assignee: NVIDIA Corporation, Santa Clara, CA (US)

( * ) Notice: Subject to any disclaimer, the term of this patent is extended or adjusted under 35 U.S.C. 154(b) by 170 days.

(21) Appl. No.: 13/461,720

(22) Filed: May 1, 2012

(65) Prior Publication Data

US 2013/0297605 A1 Nov. 7, 2013

(51) Int. Cl.
*G06F 7/00* (2006.01)
*G06F 17/30* (2006.01)
*G06F 17/27* (2006.01)
*G06Q 10/04* (2012.01)
*G06F 15/16* (2006.01)

(52) U.S. Cl.
CPC ...... *G06F 17/30958* (2013.01); *G06F 17/2705* (2013.01); *G06F 17/30705* (2013.01); *G06Q 10/04* (2013.01)

(58) Field of Classification Search
CPC ................ G06F 17/30705; G06F 17/2705
USPC .................................................. 707/737, 755
See application file for complete search history.

(56) References Cited

U.S. PATENT DOCUMENTS

| 7,017,043 | B1 * | 3/2006 | Potkonjak ...................... 716/121 |
| 2008/0002725 | A1 * | 1/2008 | Alicherry et al. ............. 370/401 |
| 2011/0164527 | A1 * | 7/2011 | Mishra et al. ................. 370/252 |
| 2012/0051589 | A1 * | 3/2012 | Schloegel et al. ............. 707/737 |

OTHER PUBLICATIONS

J. R. Allwright, R. Bordawekar, P. D. Coddington, K. Dincer and C.L. Martin. A Comparison of Parallel Graph Coloring Algorithms. SCCS-666, Northeast Parallel Architectures Center at Syracuse University, 1994.*
Cohen et al., U.S. Appl. No. 13/461,710, filed May 1, 2012.
Luby, M. "A Simple Parallel Algorithm for the Maximal Independent Set Problem," ACM, 1985, pp. 1-10.
Jones, M. T. et al., "A Parallel Graph Coloring Heuristic," Preprint MCS-P246-0691, Jun. 1991 (Revised Feb. 1992), pp. 1-20.
Allwright, J. R. et al., "A Comparison of Parallel Graph Coloring Algorithms," SCCS-666,1995, pp. 1-19.
Gebremedhin, A. H., "Parallel Graph Coloring," Thesis, Spring 1999, pp. 1-82.
Patwary, Md. M. A. et al., "New Multithreaded Ordering and Coloring Algorithms for Multicore Architectures," Proceedings of the 17th international conference on Parallel processng, pp. 1-12.

* cited by examiner

*Primary Examiner* — Greta Robinson
*Assistant Examiner* — Brian E. Weinrich
(74) *Attorney, Agent, or Firm* — Zilka-Kotab, PC (57) ABSTRACT

A system, method, and computer program product are provided for categorizing a plurality of vertices of a graph. A predetermined plurality of random numbers is assigned to each vertex of the plurality of vertices, a determination is made whether each of the assigned predetermined plurality of random numbers of a single vertex is greater than a corresponding random number of the assigned predetermined plurality of random numbers of each of the neighbors of the single vertex, and in response to the determination, one of the assigned random numbers is selected from a group of assigned random numbers of the single vertex.

17 Claims, 8 Drawing Sheets

FIGURE 7

SYSTEM, METHOD, AND COMPUTER PROGRAM PRODUCT FOR PERFORMING GRAPH COLORING

FIELD OF THE INVENTION

The present invention relates to computing independent sets over a graph, and more particularly to graph coloring.

BACKGROUND

Performing graph coloring by computing independent sets is a valuable decision making practice. For example, graph coloring may be used by parallel algorithms to find parallelism in data. However, current techniques for performing graph coloring by computing independent sets have been associated with various limitations.

For example, current implementations for performing graph coloring by computing independent sets have shown a variety of inefficiencies which may be amplified as data sets analyzed using these methodologies increase in size. Furthermore, current implementations may show inefficiencies when performed on parallel computing devices. There is thus a need for addressing these and/or other issues associated with the prior art.

SUMMARY

A system, method, and computer program product are provided for categorizing a plurality of vertices of a graph into independent sets. A predetermined plurality of random numbers is assigned to each vertex of the plurality of vertices, a determination is made whether each of the assigned predetermined plurality of random numbers of a single vertex is greater than a corresponding random number of the assigned predetermined plurality of random numbers of each of the neighbors of the single vertex, and in response to the determination, one of the assigned random numbers is selected from a group of assigned random numbers of the single vertex.

DETAILED DESCRIPTION

Figure 1A:
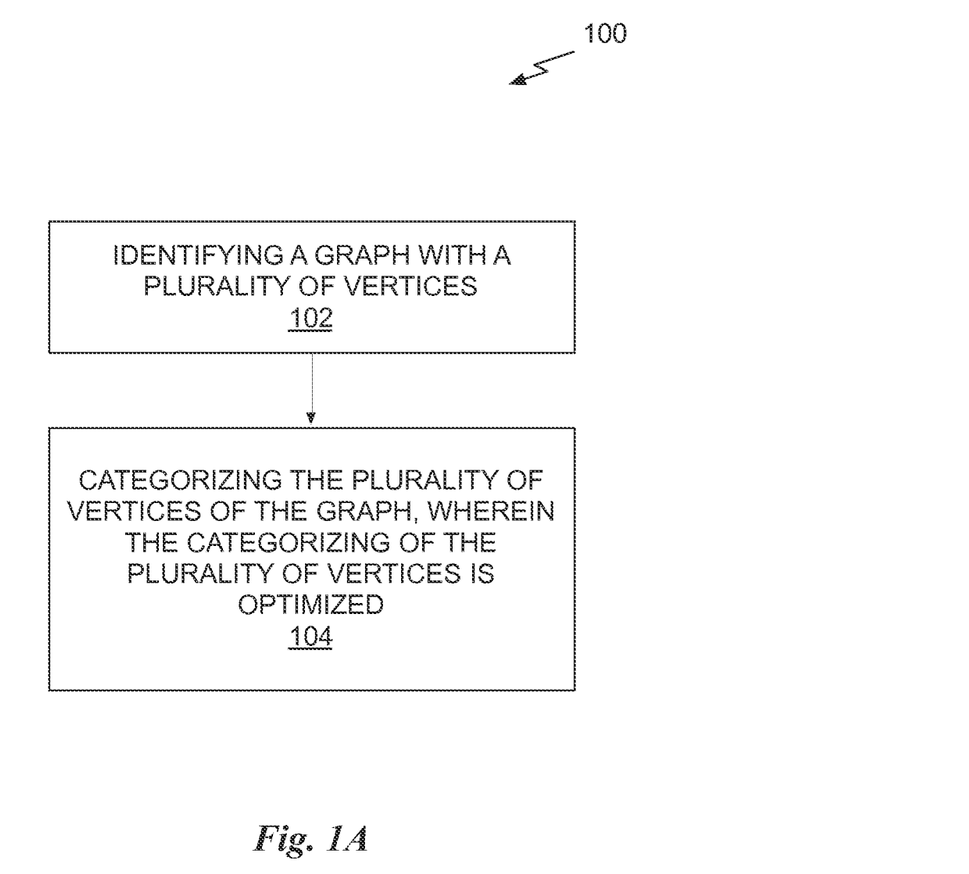
FIG. 1A shows a method for performing graph coloring, in accordance with one embodiment.

FIG. 1A shows a method 100 for performing graph coloring, in accordance with one embodiment. As shown in operation 102, a graph with a plurality of vertices is identified. In one embodiment, the graph may include a representation of the plurality of vertices, where each vertex of the plurality of vertices is connected to one or more of the other vertices by one or more links (e.g., edges, etc.). In another embodiment, each of the plurality of vertices (e.g., nodes, etc.) may represent a distinct object (e.g., a data element, etc.), such that the plurality of vertices of the graph represents a set of objects. In yet another embodiment, each link of the graph may represent an association between the vertices directly connected by the link. For example, two vertices directly connected by a link may share a dependency, a contention, etc.

Figure 1B:
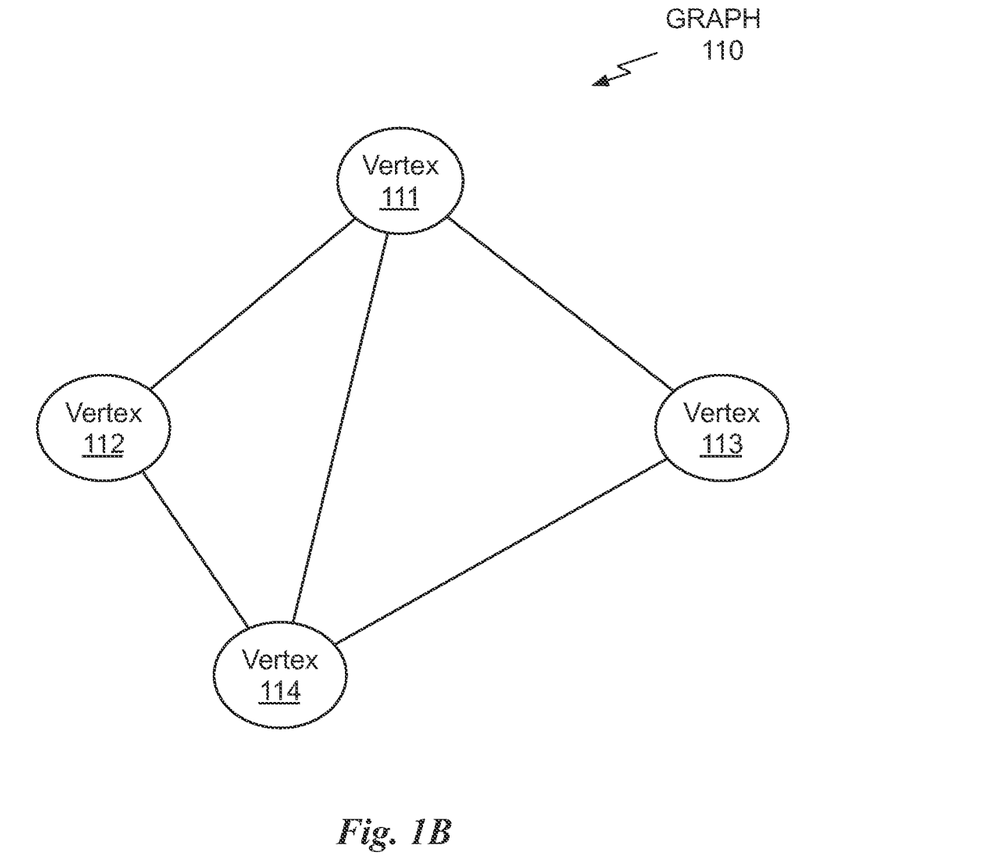
FIG. 1B shows a graph, in accordance with one embodiment.

FIG. 1B shows a graph 110, in accordance with one embodiment. The graph 110 includes vertices 111, 112, 113, and 114 that are connected by one or more links.

Additionally, as shown in operation 104, the plurality of vertices of the graph is categorized, where the categorizing of the plurality of vertices is optimized. In one embodiment, categorizing the plurality of vertices may include assigning a random number to each vertex in a graph. For example, a random number between zero and one may be generated and assigned to each of the plurality of vertices. In another embodiment, categorizing the plurality of vertices may include modifying the random number assigned to each vertex (e.g., via a mathematical operation, etc.).

Further, in one embodiment, categorizing the plurality of vertices may include comparing the assigned number of each vertex to the assigned numbers of each of the neighbors of the vertex. For example, the neighbors of a single vertex may include all other vertices directly connected to the single vertex by a single link within the graph (e.g., vertices not connected to the single vertex through another vertex, etc.).

Further still, in one embodiment, categorizing the plurality of vertices may include determining whether the assigned number of a single vertex is greater than each of the assigned numbers of each of the neighbors of the single vertex. For example, the assigned number of the single vertex may be compared against the assigned numbers of each of the neighbors of the single vertex, and the largest number (e.g., the local maximum) may be determined from those assigned numbers. In another embodiment, the determination whether the assigned number of a single vertex is greater than each of the assigned numbers of each of the neighbors of the single vertex may be performed for each vertex of the graph.

In addition, in one embodiment, categorizing the plurality of vertices may include determining whether the assigned number of a single vertex is less than each of the assigned numbers of each of the neighbors of the single vertex. For example, the assigned number of the single vertex may be compared against the assigned numbers of each of the neighbors of the single vertex, and the smallest number (e.g., the local minimum) may be determined from those assigned numbers. In another embodiment, the determination whether the assigned number of a single vertex is less than each of the assigned numbers of each of the neighbors of the single vertex may be performed for each vertex of the graph.

In one embodiment, the assigned number to each vertex may be modified by adding, subtracting, multiplying, or otherwise operating on the assigned number via a second number, where the second number depends on some properties of the vertex or is chosen by some procedure. The determination whether the assigned number is greater than each of the assigned numbers of each of the neighbors of the simple vertex may be affected by the combination of the first and second numbers. In another embodiment, the random number may include a random number R and may be supplemented by another value S to form a pair of values (R,S) to be considered together when comparing graph vertices. In still another embodiment, the value S may be derived from a property of the graph, such as the vertex degree, or some function thereof. Additionally, the pair of values (R,S) may be merged into a single value as an optimization, (e.g., by summing the two numbers, storing the bits of R and S within a single integer, etc.).

Also, in one embodiment, categorizing the plurality of vertices may include adding the single vertex to an independent set if it is determined that the assigned number of the single vertex is greater than the assigned numbers of each of the neighbors of the single vertex. In another embodiment, all vertices in the graph that have an assigned number greater than the assigned numbers of each of their neighbors may be added to the independent set. In this way, all the vertices within the independent set may be independent from each other. For example, none of the vertices within the independent set may be directly connected within the graph. In another example, all the vertices within the independent set may not share any dependencies or contentions with each other.

In addition, in one embodiment, categorizing the plurality of vertices may include labeling (e.g., coloring, etc.) all vertices in the independent set. For example, each of the vertices in the independent set may be labeled as independent vertices. In another example, all the vertices in the independent set may be assigned the same value from a finite set of values (e.g., a single color from a finite set of colors, etc.).

Further, in one embodiment, categorizing the plurality of vertices may include removing the vertices in the independent set from the graph and subsequently categorizing the remaining vertices in the graph. For example, categorizing the plurality of vertices may be performed through a plurality of iterations, where during each iteration, all independent vertices may be identified, placed in an independent set, labeled, and removed from the graph categorized by a subsequent iteration. In another embodiment, each iteration may be associated with its own independent set, and each independent set may be labeled with a different value (e.g., color, etc.) than the other independent sets, such that each iteration's independent set contains all independent vertices from that iteration. In yet another embodiment, only a portion of the plurality of vertices may be categorized during the categorization. For example, categorizing the plurality of vertices may be performed through a plurality of iterations, where the categorizing may stop when a predetermined amount of vertices are categorized, a predetermined number of iterations are performed, etc.

Further still, in one embodiment, optimizing the categorizing may include utilizing a hash function to assign a pseudo random number to each vertex in the graph during the categorizing. For example, an index of each vertex in the graph may be hashed utilizing a hash function in order to obtain the random number that is assigned to that vertex. In this way, one or more lookups may be avoided during the categorizing. For example, the random number of each vertex in the graph may be obtained by hashing the index of each vertex during the categorizing instead of looking up a random number associated with the vertex in a data structure (e.g., an array, a table, etc.) to which the random numbers are assigned.

Also, in one embodiment, optimizing the categorizing may include comparing the assigned number of each vertex to the assigned numbers each of the neighbors of the vertex, and determining whether the assigned number of a single vertex is greater than each of the assigned numbers of each of the neighbors of the single vertex and at the same time determining whether the assigned number of a single vertex is less than each of the assigned numbers of each of the neighbors of the single vertex.

For example, the assigned number of the single vertex may be compared against the assigned numbers of each of the neighbors of the single vertex, and the largest number (e.g., the local maximum) and the smallest number (e.g., the local minimum) may be determined from those assigned numbers. In another embodiment, the determination whether the assigned number of a single vertex is greater than each of the assigned numbers of each of the neighbors of the single vertex may be performed for each vertex of the graph.

In another embodiment, all vertices in the graph that have an assigned number greater than the assigned numbers of each of their neighbors may be added to a first independent set, and all vertices in the graph that have an assigned number less than the assigned numbers of each of their neighbors may be added to a second independent set separate from the first independent set. In this way, the number of iterations performed during the categorizing of the plurality of vertices may be reduced (e.g., by a factor of two), since twice as many vertices may be added to independent sets during each iteration.

Additionally, in one embodiment, optimizing the categorizing may include removing one or more of the plurality of vertices from consideration during the categorizing when such one or more vertices have been added to an independent set. For example, the plurality of vertices may be stored in a data structure (e.g., a sparse matrix data structure, etc.), and when one or more vertices have been added to an independent set, such vertices may be marked within the data structure and may be ignored during future categorizing iterations.

Further, in one embodiment, optimizing the categorizing may include altering a size of the graph during the categorizing. For example, optimizing the categorizing may include reducing a size of the graph after one or more iterations of the categorizing. In another embodiment, when one or more vertices have been added to an independent set during the optimizing, such vertices and their corresponding edges may be removed from the graph, which may result in a new graph with fewer vertices and edges than the earlier graph. Additionally, this new graph may be used for future categorizing iterations. In another embodiment, optimizing the categorizing may be performed orthogonally (e.g., such that multiple optimizations may be applied independently from each other, etc.).

Further still, in one embodiment, optimizing the categorizing may include assigning a predetermined plurality of random numbers to each vertex of the plurality of vertices. For example, a predetermined amount of random numbers (e.g., N random numbers, where N is an integer) may be generated for each vertex of the plurality of vertices. In another example, a predetermined plurality of hash functions may be computed for each vertex of the plurality of vertices.

In another embodiment, the amount of the predetermined plurality of random numbers assigned to each vertex may be determined in a data-dependent fashion. In yet another embodiment, the amount of the predetermined plurality of random numbers assigned to each vertex may be determined with respect, to a probability. For example, the amount of the predetermined plurality of random numbers assigned to each vertex may be determined with respect to a probability that every vertex of the plurality of vertices is added to an independent set, or with respect to a probability that a desired fraction of the plurality of vertices is added to an independent set.

Also, in one embodiment, optimizing the categorizing may include comparing the assigned predetermined plurality of random numbers of each vertex to the corresponding assigned predetermined plurality of random numbers of each of the neighbors of the vertex. For example, the first of the plurality of assigned random numbers for a vertex may be compared to the first of the plurality of assigned random numbers for each of the neighbors of the vertex. In another example, the Nth random number of the plurality of assigned random numbers for a vertex may be compared to the Nth random number of the plurality of assigned random numbers for each of the neighbors of the vertex, where N is an integer.

Additionally, in one embodiment, optimizing the categorizing of the plurality of vertices may include determining whether each of the assigned predetermined plurality of random numbers of a single vertex is greater than the corresponding random number of the assigned predetermined plurality of random numbers of each of the neighbors of the single vertex. For example, the Nth assigned number of the single vertex may be compared against the Nth assigned number of each of the neighbors of the single vertex, and the largest number (e.g., the local maximum) may be determined from those assigned numbers. In another embodiment, the determination whether the Nth assigned number of a single vertex is greater than each of the Nth assigned numbers of each of the neighbors of the single vertex may be performed for each vertex of the graph.

Further, in one embodiment, optimizing the categorization may include adding the single vertex to an independent set if it is determined that one or more of the assigned predetermined plurality of random numbers of the single vertex is greater than the corresponding assigned predetermined plurality of random numbers of each of the neighbors of the single vertex. For example, if it is determined that the Nth assigned number of the single vertex is the local maximum when compared against the Nth assigned number of each of the neighbors of the single vertex, then the single vertex may be added to an independent set associated with the Nth assigned number.

In a further embodiment, rather than determining if the Nth assigned number of the single vertex is the local maximum when compared against the Nth assigned number of each of the neighbors of the single vertex, optimizing the categorizing may include determining whether the Nth assigned number of the single vertex is the local minimum when compared against the Nth assigned number of each of the neighbors of the single vertex. Further still, it may simultaneously be determined whether the single vertex is the local minimum or the local maximum when compared against the Nth assigned number of each of the neighbors of the single vertex.

Further still, in one embodiment, it may be determined that a group of more than one of the assigned predetermined plurality of random numbers of a single vertex are the local maximum when compared to the corresponding assigned predetermined plurality of random numbers of each of the neighbors of the single vertex. In another embodiment, in response to the determination, one of the assigned random numbers may be selected from the group. In another embodiment, the single vertex may be added to an independent set associated with the selected assigned number. In yet another embodiment, the one of the assigned random numbers may be selected from the group arbitrarily, according to one or more predetermined criteria, etc.

Also, in one embodiment, optimizing the categorizing may include labeling (e.g., coloring, etc.) all vertices in each independent set. For example, each of the vertices in each independent set may be labeled as independent vertices. In another example, all the vertices in an independent set may be assigned the same value from a finite set of values (e.g., the same color from a finite set of colors, etc.).

Additionally, in one embodiment, an independent set may be associated with each of the predetermined plurality of random numbers assigned to each vertex of the plurality of vertices. For example, a predetermined group of random numbers may be generated for each vertex of the plurality of vertices, where each random number has a predetermined position within the group. Additionally, a first random number found at the first position of the group may be associated with a first independent set, a second random number found at a second position of the group may be associated with a second independent set, and so on, such that a total amount of independent sets for the graph is equal to the amount of random numbers in the group. In yet another embodiment, each independent set may be associated with a distinct color (e.g., a single color from a finite set of colors, etc.), such that all vertices in each independent set may be labeled with the color associated with that independent set. In this way, a plurality of independent sets and associated colors may be determined for the graph in a single pass. Additionally, categorizing the plurality of vertices may be performed through a single iteration.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
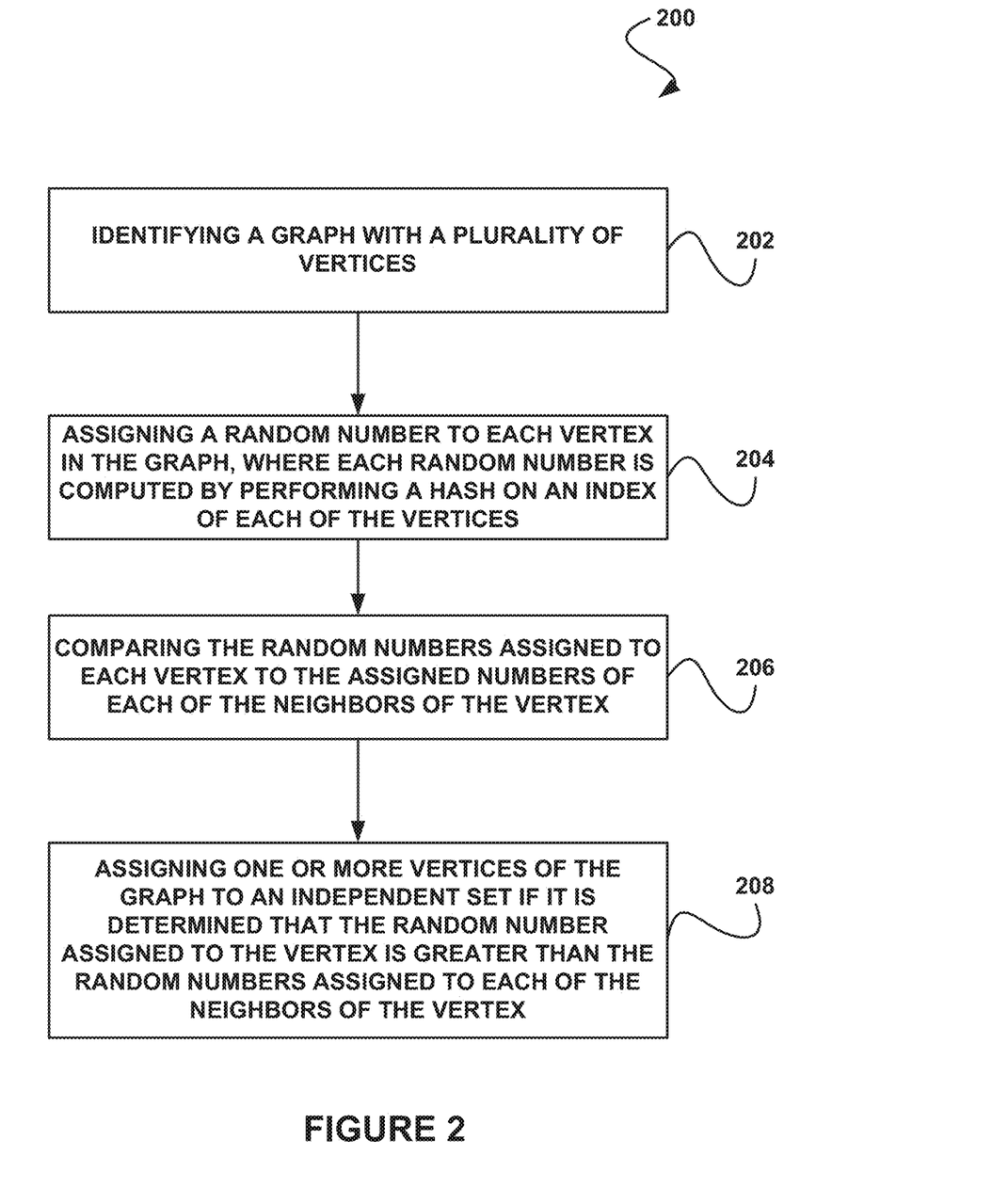
FIG. 2 shows a method for computing random values during graph coloring using a hash, in accordance with another embodiment.

FIG. 2 shows a method 200 for computing random values during graph coloring using a hash, in accordance with another embodiment. As an option, the method 200 may be carried out in the context of the functionality of FIG. 1A. Of course, however, the method 200 may be implemented in any desired environment. It should also be noted that the aforementioned definitions may apply during the present description.

As shown in operation 202, a graph with a plurality of vertices is identified. Additionally, as shown in operation 204, a random number is assigned to each vertex in the graph, where each random number is computed by performing a hash on an index of each of the vertices. For example, a data structure may include an index of each vertex within the graph, and these indices may be hashed in order to determine a random number for each vertex. In another embodiment, both a hash and a deterministic measurement may be computed for each of the vertices. In yet another embodiment, the random number may be computed by performing a hash on an index of each of the vertices and adding the random number to the degree of each vertex (e.g., the number of direct neighbors of each vertex), such that vertices with a higher degree may be assigned to an independent set and colored sooner than vertices with a lower degree.

In this way, a random number can be computed for each vertex without having to read the random numbers from memory. For example, performing a hash on an index of each of the vertices may avoid having to look up random numbers assigned to each vertex that are stored in an array in random memory, where such memory access may be slower than the performing of the hash. Additionally, performing a hash on an index of each of the vertices may avoid a need for a global synchronization. For example, performing a hash on an index of each of the vertices may avoid having to choose a random number utilizing a thread, assigning the random number to a vertex, waiting for all threads to finish choosing and assigning a random number for all vertices, and performing a global synchronization where all threads fill a table with the chosen random numbers and synchronize before continuing with the graph coloring.

Further, as shown in operation 206, the random number assigned to each vertex is compared to the assigned numbers each of the neighbors of the vertex. Further still, as shown in operation 208, one or more vertices of the graph are assigned to an independent set if it is determined that the random number assigned to the vertex is greater than the random numbers assigned to each of the neighbors of the vertex.

Further still, in one embodiment, assigning the random number to each vertex by performing a hash, comparing the random numbers, and assigning one or more vertices to an independent set may be performed as part of one or more of an independent set determination process and a graph coloring process. For example, a graph coloring process may be used to determine independent sets among the plurality of vertices of the graph. Table 1 illustrates an exemplary independent set determination method. Of course, it should be noted that the method shown in Table 1 is set forth for illustrative purposes only, and thus should not be construed as limiting in any manner.

TABLE 1

Method PMIS

1. For each vertex j (in parallel)
    Phi[j] = random value
2. For each vertex j that is unmarked (in parallel)
    If Phi [j] is larger than Phi[k] for all edge (j,k) (parallel reduction)
        Mark as part of set
        Mark all neighboring vertices as not part of set (can skip on last iteration)
3. Count number of unmarked vertices (parallel reduction)
If (count > 0) goto 2

Also, in one embodiment, performance of a single iteration of the method in Table 1 may result in the production of an independent net that may not be maximal. For example, for the non-maximal variant, "Mark all neighboring vertices as not part of set" may be skipped, as may step 3. In another embodiment, the algorithm may also be modified to prioritize, for example, high degree vertices by setting Phi[j] equal to the degree of vertex j plus a random number in the range [0,1).

In another example, a graph coloring method may be used to color independent sets of vertices computed from a graph. Table 2 illustrates an exemplary graph coloring method. Of course, it should be noted that the method shown in Table 2 is set forth for illustrative purposes only, and thus should not be construed as limiting in any manner.

TABLE 2

Method GraphColor

While uncolored vertices exist
    Compute S = PMIS (or non-maximal independent set)
    Mark all entries of S as color = c
    Remove all entries of S from graph
    c++

Additionally, see, for example, M. Luby, "A simple parallel algorithm for the maximal independent set problem," *SIAM Journal on Computing* 4 (1986) 1036; M. T. Jones and P. E. Plassmann, "A Parallel Graph Coloring Heuristic," *SIAM Journal of Scientific Computing* 14 (1993) 654; and J. R. Allwright, R. Bordawekar, P. D. Coddington, K. Dincer, and C. L. Martin, "A comparison of parallel graph coloring algorithms." Technical Report Tech. Rep. SCCS-666, Syracuse University, 1995, which are hereby incorporated by reference in its entirety, and which describes exemplary independent set determination methods and graph coloring methods.

Further, in one embodiment, with respect to Table 1, computing a random number for each vertex of the graph by performing a hash on an index of each vertex may include computing Phi[k] directly on-chip via a hash function from column index data that is stored in a sparse matrix data structure. This may be performed instead of reading Phi[k] from an auxiliary array, which may require a gather from memory. In another embodiment, computing a random number for each vertex of the graph by performing a hash on an index of each vertex may also allow the method to skip loop 1 of Table 1 entirely.

In this way, an entire iteration of the independent set determination method may become a single generalized sparse matrix-vector product (SpMV) operation for which efficient parallel implementations may exist, followed by a parallel reduction in loop 3 for Table 1. In another embodiment, if only an independent set is desired, then loop 3 of Table 1 may be skipped, and the entire method may be constructed as a single generalized sparse matrix-vector product. In this way, no extraneous global communication and no global synchronization may be required.

Figure 3:
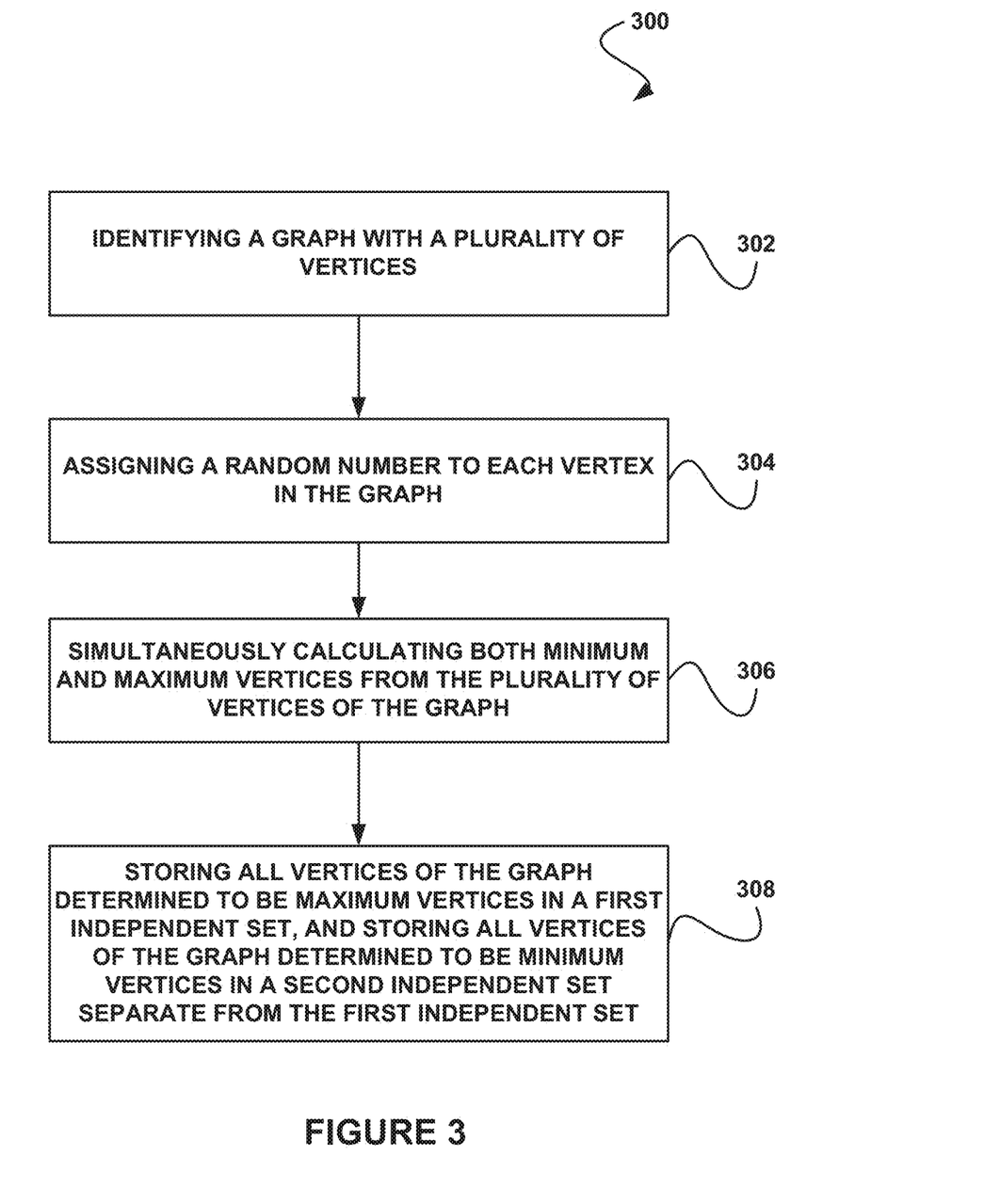
FIG. 3 shows a method for computing a local maximum and minimum during graph coloring, in accordance with yet another embodiment.

FIG. 3 shows a method 300 for computing a local maximum and minimum during graph coloring, in accordance with another embodiment. As an option, the method 300 may be carried out in the context of the functionality of FIGS. 1 and 2. Of course, however, the method 300 may be implemented in any desired environment. It should also be noted that the aforementioned definitions may apply during the present description.

As shown in operation 302, a graph with a plurality of vertices is identified. Additionally, as shown in operation 304, a random number is assigned to each vertex in the graph. Further, as shown in operation 306, both minimum and maximum vertices are simultaneously calculated from the plurality of vertices of the graph. In one embodiment, maximum vertices may be calculated by determining whether the random number assigned to each vertex is greater than each of the random numbers assigned to all of the neighbors of each vertex.

Additionally, minimum vertices may be calculated by determining whether the random number assigned to each vertex is less than each of the random numbers assigned to all of the neighbors of the each vertex. In another embodiment, determining the maximum vertices of the graph may be performed simultaneously with determining the minimum vertices of the graph. In yet another embodiment, if a vertex is determined to be both a minimum and maximum vertex, then the vertex may be automatically determined to be either a minimum or maximum vertex (e.g., through an arbitrary selection, through a predetermined default determination, etc.).

Further still, as shown in operation 308, all vertices of the graph determined to be maximum vertices may be stored in a first independent set, and all vertices of the graph determined to be minimum vertices may be stored in a second independent set separate from the first independent set. In one embodiment, assigning the random number to each vertex in the graph, simultaneously calculating minimum and maximum vertices from the graph, and assigning maximum and minimum vertices to separate independent sets may be performed as part of one or more of an independent set determination method and a graph coloring method.

For example, Table 3 illustrates a modified independent set determination method that computes both minimum and maximum vertices. Of course, it should be noted that the method shown in Table 3 is set forth for illustrative purposes only, and thus should not be construed as limiting in any manner.

TABLE 3

Modified Method PMIS

1. For each vertex j (in parallel)
    Phi[j] = random value
2. For each vertex j (in parallel)
    If j is unmarked
    If Phi[j] is larger/smaller than Phi[k] for all edge (j,k) (parallel reduction)
        Mark as part of max/min set
        Mark all neighboring vertices as not part of max/min set
    Else if j is marked as not part of min set, but unmarked regarding max set
    If Phi [j] is larger than Phi[k] for all edge (j,k) (parallel reduction)
        Mark as part of max set
        Mark all neighboring vertices as not part of max set
    Else if j is marked as not part of max set, but unmarked regarding min set
    If Phi [j] is smaller than Phi [k] for all edge (j,k) (parallel reduction)
        Mark as part of min set
        Mark all neighboring vertices as not part of min set
3. Count number of unmarked vertices (parallel reduction)
If (count > 0) goto 2

Additionally, in one embodiment, the method in Table 3 may be organized as a single reduction with predicated queries (e.g., "is j min/max," etc.) which may reduce execution divergence on a GPU or other vector architecture. In another embodiment, the total per-iteration cost may be almost unchanged from the method shown in Table 1, but the number of iterations necessary for performing graph coloring may be reduced by half by using the method shown in Table 3.

In this way, both the local maximum vertices and the local minimum vertices may be determined from the graph at the same time. In one embodiment, both the local maximum vertices and the local minimum vertices may be guaranteed to be independent sets, and also disjoint (e.g., any vertices that are both a local maximum and a local minimum will be disconnected and may be considered part of either set arbitrarily). In another embodiment, if a naïve graph coloring method is developed that requires independent sets (not maximal independent sets), then each iteration of the method shown in Table 2 may require only steps 1 and 2 in the method shown in Table 1, where step 2 in Table 1 may be modified to compute 2 sets at the same time. Therefore, this new method may require half the number of iterations, with a minor per-iteration cost. In yet another embodiment, a number of global synchronizations may be reduced (e.g., by a factor of 2).

Further, in one embodiment, in the case of a method different from the one shown in Table 2 that may require maximal independent sets, the above method shown in Table 3 may need to keep two flags instead of just one to mark whether a node is a member of a maximum set or adjacent (e.g., a first flag), or whether it is a member of the minimum set or adjacent (e.g., a second flag). In another embodiment, a different method than that shown in Table 2 may be used, where such method selects colors in a different way based on information gathered from previously assigned colors.

Figure 4:
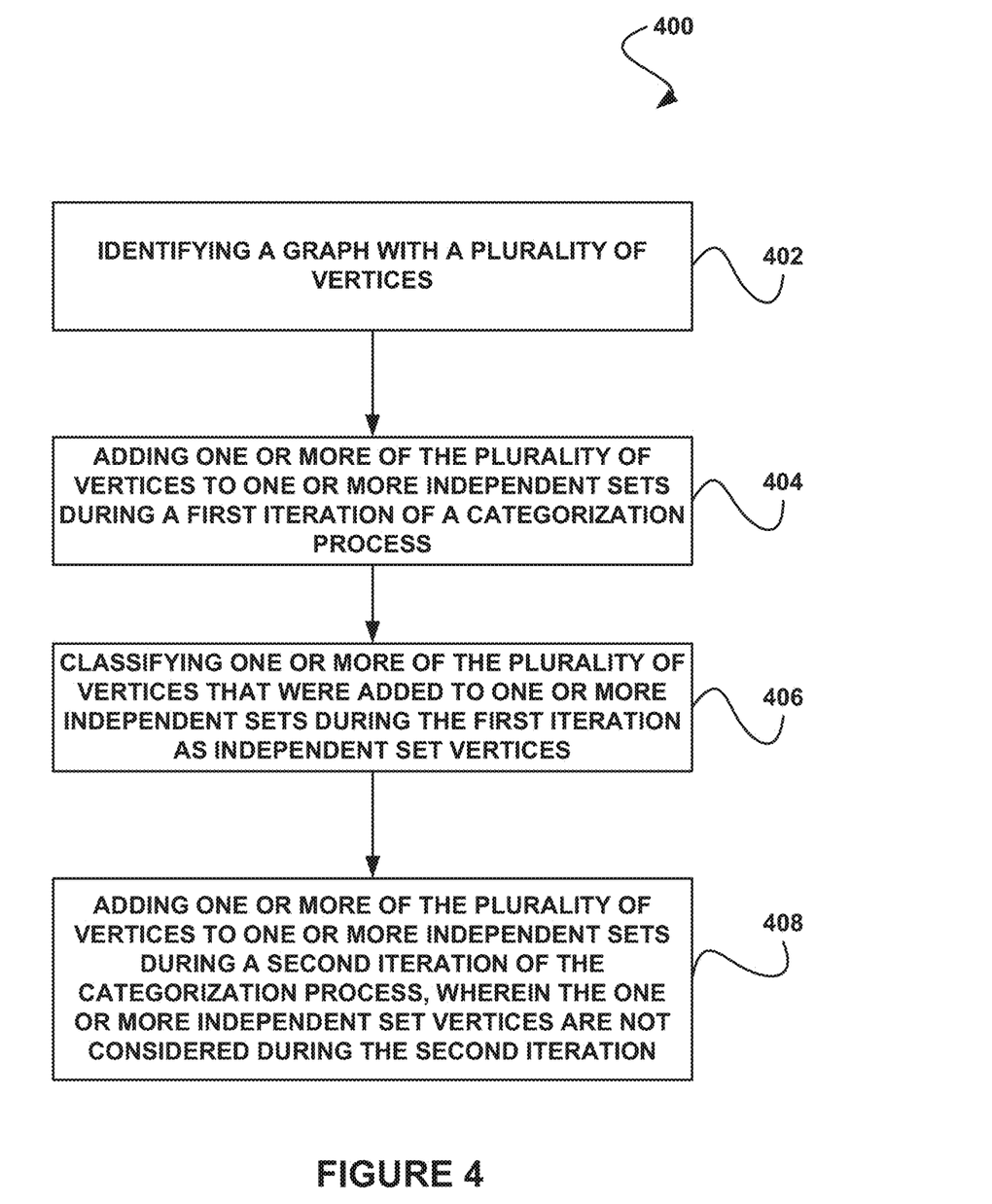
FIG. 4 shows a method for removing one or more of a plurality of vertices from consideration during a categorization, in accordance with yet another embodiment.

FIG. 4 shows a method 400 for removing one or more of a plurality of vertices from consideration during a categorization, in accordance with another embodiment. As an option, the method 400 may be carried out in the context of the functionality of FIGS. 1-3. Of course, however, the method 400 may be implemented in any desired environment. It should also be noted that the aforementioned definitions may apply during the present description.

As shown in operation 402, a graph with a plurality of vertices is identified. Additionally, as shown in operation 404, one or more of the plurality of vertices are added to one or more independent sets during a first iteration of a categorization process. Further, as shown in operation 406, the one or more of the plurality of vertices that were added to one or more independent sets during the first iteration of the categorization process are classified as independent set vertices. In one embodiment, classifying the one or more of the plurality of vertices as independent set vertices may include marking the vertices (e.g., tagging the vertices, etc.).

Further still, as shown in operation 408, one or more of the plurality of vertices are added to one or more independent sets during a second iteration of the categorization process, wherein the one or more of the plurality of vertices that were classified as independent set vertices in the first iteration of the categorization process are not considered during the second iteration of the categorization process. In one embodiment, the first and second iterations of the categorization process may be performed as part of one or more of an independent set determination method and a graph coloring method.

Also, in one embodiment, the method 400 may address the observation a step 2 of the method in Table 1 may need to only consider the unmarked nodes to accelerate successive iterations of the method. For example, beginning with a set of N unmarked graph nodes, the number of unmarked nodes at the end of the K-th iteration of the method in Table 1 may be on the order of $N*(1/C)^K$ for some constant $C>1$.

Additionally, in one embodiment, this optimization may include one or more distinct implementations depending on an underlying data structure associated with the categorization. For example, for sparse matrix formats where the per-row column indices are easily determined (e.g., CSR, ELL, etc.), the current state of a node may be looked up and an early-out may be performed if the node is marked (e.g., an early out of step 2 of the method in Table 1, etc.).

In another embodiment, for matrix formats where the per-row column indices may not be easily determined, an auxiliary data structure (e.g. a CSR row pointer for the COO format) may by pre-computed, or the optimization may be applied directly to the individual matrix entries. This may result in a more favorable memory access pattern and may avoid a non-trivial amount of work.

Figure 5:
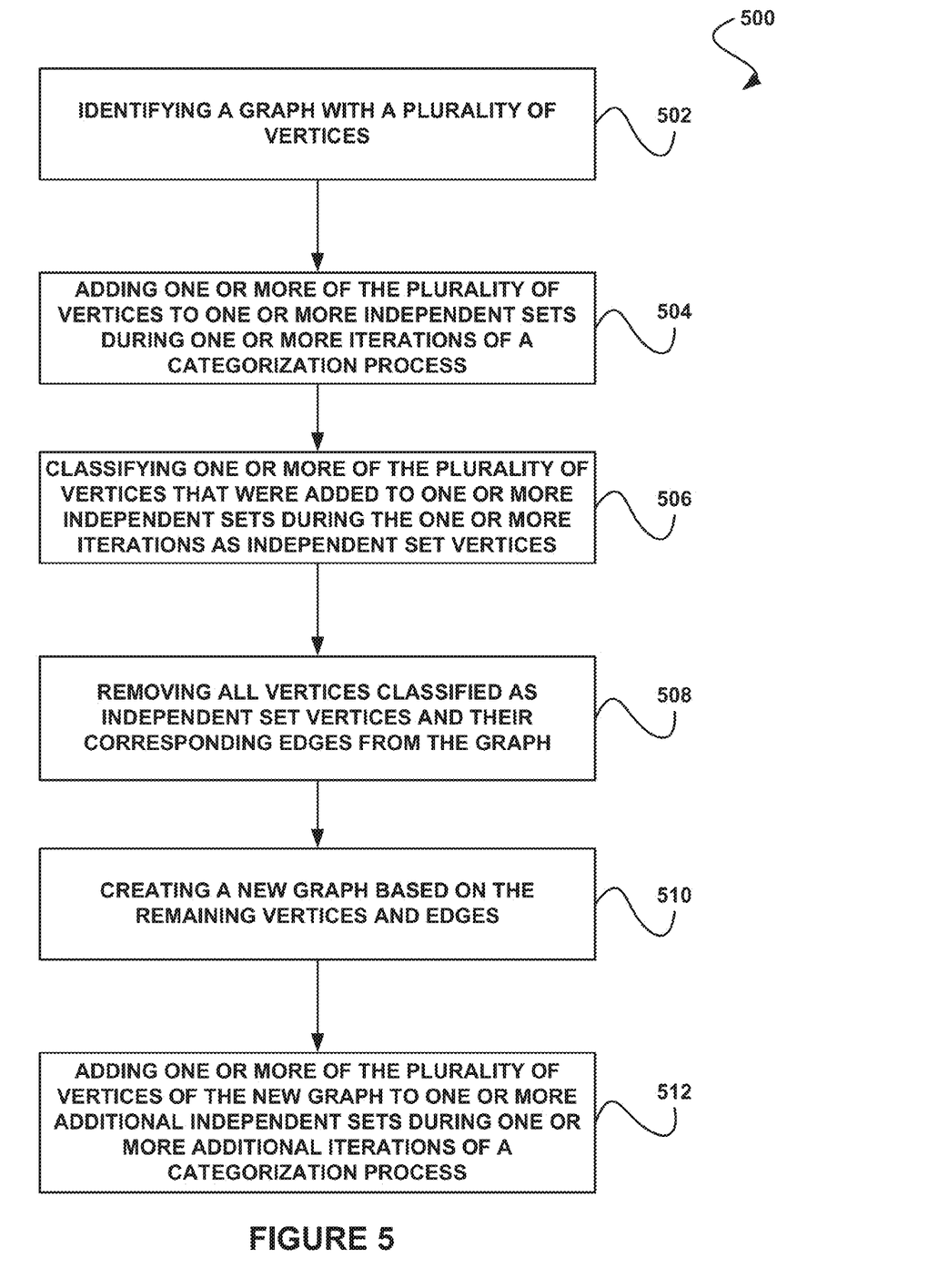
FIG. 5 shows a method for compressing a graph during a categorization, in accordance with yet another embodiment.

FIG. 5 shows a method 500 for compressing a graph during a categorization, in accordance with another embodiment. As an option, the method 500 may be carried out in the context of the functionality of FIGS. 1-4. Of course, however, the method 500 may be implemented in any desired environment. It should also be noted that the aforementioned definitions may apply during the present description.

As shown in operation 502, a graph with a plurality of vertices is identified. Additionally, as shown in operation 504, one or more of the plurality of vertices are added to one or more independent sets during one or more iterations of a categorization process. Further, as shown in operation 506, the one or more of the plurality of vertices that were added to one or more independent sets during the first iteration of the categorization process are classified as independent set vertices.

Further still as shown in operation 508, all vertices classified as independent set vertices as well as their corresponding edges are removed from the graph. Also, as shown in operation 510, a new graph is created based on the remaining vertices and edges. In addition, as shown in operation 512, one or more of the plurality of vertices of the new graph are added to one or more additional independent sets during one or more additional iterations of the categorization process. In this way, the new graph may only contain vertices that are still active (e.g., not in an independent set, etc.).

Also, in one embodiment, the removal of vertices and edges from the graph and the creation of the new graph may be performed as part of one or more of an independent set determination method and a graph coloring method. For example, the method shown in Table 1 may be accelerated on a fixed graph data structure. Performance may be further enhanced by explicitly compressing a graph data structure once a population of unmarked nodes falls below a threshold.

For instance, it may be determined that the cost of performing a further iteration on the present data structure is higher than a cost of producing a new data structure consisting of only the unmarked nodes, plus the (reduced) cost of iterating on the smaller structure, and as a result the method 500 may choose to compress the matrix representation in response to such determination. In one embodiment, a format of the new matrix structure may be the same as the first matrix structure or different from the first matrix structure. In another embodiment, the above methodology may be performed, via a parallel prefix sum.

In yet another embodiment, there may be a switch to a serial algorithm once a number of uncolored nodes reaches a predetermined amount. For example, a parallel method may be performed on a first graph for a certain number of categorization iterations, and when a particular threshold number of uncategorized vertices are determined, a new graph may be created, and a serial method running on a serial processor may perform additional categorization iterations on the remaining vertices within the new graph.

Additionally, in one embodiment, a predetermined amount of error may be allowed during the categorization. For example, the categorization may complete after a predetermined event (e.g., a predetermined number of iterations, a predetermined number of marked vertices, etc.). In another example, after the predetermined event, all unmarked vertices may be assigned to a particular set, assigned a particular color, etc. The resulting categorization may not meet the criteria of a graph coloring or independent set, but may be "approximately independent" or an "approximate coloring."

Figure 6:
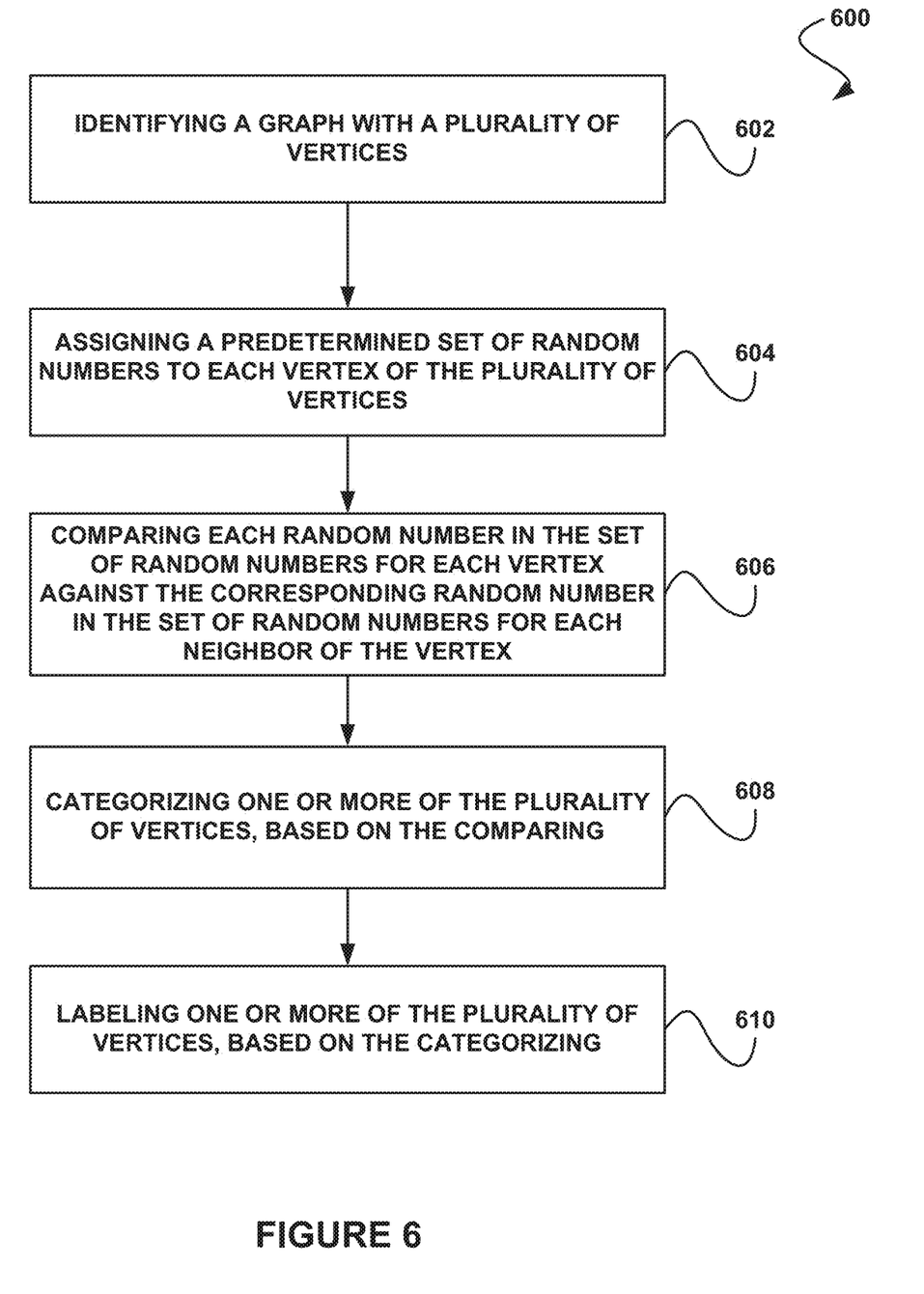
FIG. 6 shows a method for performing single-pass graph coloring, in accordance with yet another embodiment.

FIG. 6 shows a method 600 for performing single-pass graph coloring, in accordance with another embodiment. As an option, the method 600 may be carried out e context of the functionality of FIGS. 1-5. Of course, however, the method 600 may be implemented in any desired environment. It should also be noted that the aforementioned definitions may apply during the present description.

As shown in operation 602, a graph with a plurality of vertices is identified. Additionally, as shown in operation 604, a predetermined set of random numbers is assigned to each vertex of the plurality of vertices. In one embodiment, for each vertex, each random number in the set of random numbers may be arbitrarily generated. In another embodiment, for each vertex each random number in the set of random numbers may be generated by computing a hash function of the vertex for each of the set of random numbers.

Additionally, in one embodiment, an amount of random numbers within the set may be determined with respect to a probability that a certain percentage of vertices or every vertex of the plurality of vertices is added to an independent set during a single categorization pass (e.g., a single pass of a categorization algorithm). For example, the amount of random numbers for each vertex may be chosen so that, with a high probability, all or a majority of vertices in the graph will receive a color in a single round of graph coloring.

Further, as shown in operation 606, for each vertex, each random number in the set of random numbers is compared against the corresponding random number in the set of random numbers for each neighbor of the vertex. In one embodiment, each of the random numbers in the set may be ordered by position within the set, and the corresponding random number for a random number in a first position in the set of a given vertex may include the random number in the first position of the set of all neighbors of the given vertex, the corresponding random number for a random number in a second position in the set of a given vertex may include the random number in the second position of the set of all neighbors of the given vertex, and so on.

Further still, in one embodiment, comparing each random number in a certain position in a vertex's set against the corresponding random number in the same position in a set of each neighbor of the vertex may include determining whether each random number in the certain position of a vertex's set is greater than all of the corresponding random numbers the same position of each neighbor vertex's set. In another embodiment, comparing each random number in a vertex's set against the corresponding random number in the set of each neighbor of the vertex may include simultaneously determining whether the random number in a certain position of the vertex's set is larger than all of the corresponding random numbers in the same position of each neighbor vertex's set or smaller than all of the corresponding random numbers in the same position of each neighbor vertex's set.

Also, as shown in operation 608, one or more of the plurality of vertices are categorized, based on the comparing. In one embodiment, categorizing the one or more vertices may include adding one or more of the plurality of vertices to an independent set. For example, a plurality of independent sets may be provided, where each independent set is linked to one position in the set of random numbers for the plurality of vertices, such that a first independent set is linked to the first random number position in the set of all vertices, a second independent set is linked to the second random number position in the set of all vertices, and so on. In another embodiment, categorizing one or more of the plurality of vertices may include adding a vertex to an independent set linked to a particular random number position in the set of random numbers if it is determined that the random number at that position in the set of random numbers for the vertex is greater than all of the random numbers at that position in the set of random numbers for all neighbors of the vertex.

In addition, in one embodiment, both a first independent set and a second independent set may be linked to one position in the set of random numbers for the plurality of vertices. In another embodiment, categorizing one or more of the plurality of vertices may include adding a vertex to the first independent set linked to the position in the set of random numbers if it is determined that the random number at that position in the set of random numbers for the vertex is greater than all of the random numbers at that position in the set of random numbers for all neighbors of the vertex. In yet another embodiment, categorizing one or more of the plurality of vertices may include adding a vertex to the second independent set linked to the position in the set of random numbers if it is determined that the random number at that position in the set of random numbers for the vertex is less than all of the random numbers at that position in the set of random numbers for all neighbors of the vertex.

In still another embodiment, it may be determined that a single vertex contains multiple random numbers at multiple positions in the set of random numbers for the single vertex that are greater than or less than all of their respective random numbers at their respective positions in the set of random numbers for all neighbors of the vertex. In yet another embodiment, the vertex may be assigned to a single independent set associated with one of the multiple positions. Additionally, in one embodiment, the single independent set may be selected arbitrarily, according to predetermined criteria, etc.

Furthermore, as shown in operation 610, one or more of the plurality of vertices are labeled, based on the categorizing. In one embodiment, each independent set may be associated with a unique color from a finite set of colors, and each vertex assigned to the independent set may be labeled with the color associated with that independent set.

Table 4 illustrates an exemplary single-pass set determination method. Of course, it should be noted that the method shown in Table 4 is set forth for illustrative purposes only, and thus should not be construed as limiting in any manner.

TABLE 4

Color_offset = 0;
1: For every vertex j
    Compute M independent random numbers, phi(j,k) (k =1 to M)
<global sync>
2: For every vertex j
    Cj = { }
    For every random number k
        If (phi(j,k) > phi(j',k) for all neighboring vertices j'),
        Cj = union(Cj, {k})
    Select col from Cj (e.g. uniformly at random, or deterministically)
    Set color of vertex j to Color_offset + col
<global sync>
Color_offset += M
If there are uncolored vertices (test requires a parallel reduction)
    Remove color vertices from graph (possibly by simply marking them)
    Goto 1

In one embodiment, the above method shown in Table 4 may determine up to M colors in parallel in a single pass, and no global synchronization may be required between passes. In another embodiment, the above method shown in Table 4 may allow the assigning of an arbitrary number of colors between global synchronization points.

Additionally, in one embodiment, rather than calculating the random numbers phi(j,k), a hash function may be used, where the hash function maps (j,k) to a well scrambled number. This may remove the need for the first loop, and may reduce each pass of the algorithm to a single parallel kernel (plus a check to see if any vertices are uncolored).

Further, in one embodiment, in each pass, two colors may be indicated per random number by computing whether vertex j is either the max of its neighbors or the min of its neighbors (corresponding to color C or C+1, respectively). This may allow for 2M colors to be assigned in each pass from M random numbers or hash functions.

Further still, in one embodiment, M may be chosen so that, with high probability, the majority of vertices in the graph will receive a color in a single round. For example, a formula may be derived for the probability that a vertex will have an empty C set (and therefore will be uncolored after a pass of the algorithm) as a function of M and the degree of the vertices in the graph. Additionally, M may be chosen so as to drive this probability as low as desired, which may result in an algorithm that will either color a graph in P passes with high probability, or have E vertices expected to remain uncolored after P passes.

For the latter case, E may be chosen to be a small number independent of the number of vertices N, which may then be processed in serial via greedy graph coloring. This results in an algorithm that overall may be unaffected by Amdahl's Law as N grows, since the serial portion will remain O(1) with respect to N. In another embodiment, M may be chosen based on an average degree of the vertices in the graph (e.g., the average number of neighbors each vertex in the graph has).

In this way, the above method shown in Table 4 may perform a graph coloring where the number of colors does not need to be minimized, but a valid coloring may be computed as quickly as possible. Furthermore, the above method shown in Table 4 may minimize global communication and synchronization, and may have a high compute-to-bandwidth ratio, which may make it favorable for GPUs or other massively parallel devices.

Figure 7:
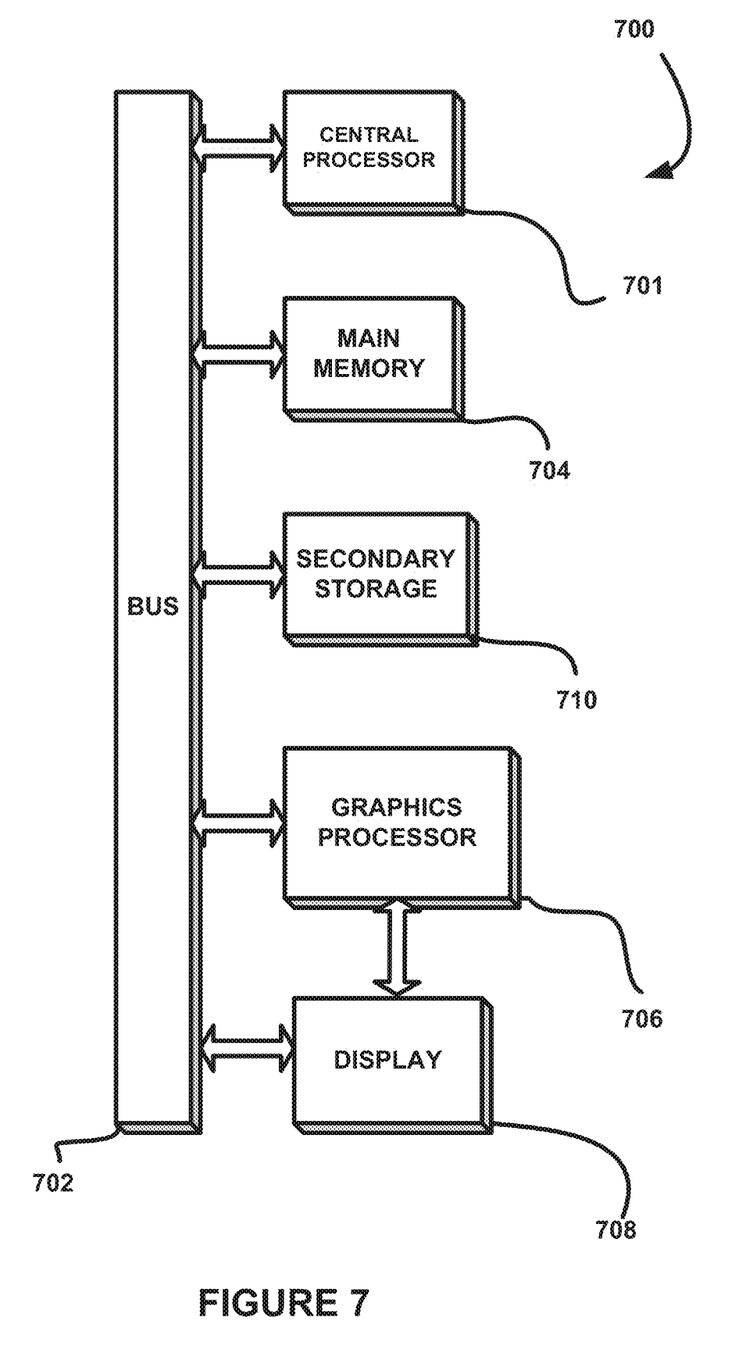
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, and/or any other type of logic. Still yet, the system 700 may take the form of various other devices m including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a graph with a plurality of vertices;
   categorizing the plurality of vertices by:
      assigning a predetermined plurality of random numbers to each vertex of the plurality of vertices;
      determining whether each of the assigned predetermined plurality of random numbers of a single vertex is greater than a corresponding random number of the assigned predetermined plurality of random numbers of each of the neighbors of the single vertex;
      determining whether the Nth assigned number of the single vertex is a local minimum when compared against the Nth assigned number of each of the neighbors of the single vertex; and
      selecting, in response to the determination, one of the assigned random numbers from a group of assigned random numbers of the single vertex, wherein the categorizing of the plurality of vertices is optimized.

2. The computer-implemented method of claim 1, further comprising generating a predetermined amount of random numbers for each vertex of the plurality of vertices.

3. The computer-implemented method of claim 1, wherein a predetermined plurality of hash functions is computed for each vertex of the plurality of vertices.

4. The computer-implemented method of claim 1, wherein an amount of the predetermined plurality of random numbers assigned to each vertex is determined with respect to a probability.

5. The computer-implemented method of claim 1, wherein an amount of the predetermined plurality of random numbers assigned to each vertex may be determined with respect to a probability that a desired fraction of the plurality of vertices is added to an independent set.

6. The computer-implemented method of claim 1, further comprising comparing the assigned predetermined plurality of random numbers of each vertex to the corresponding assigned predetermined plurality of random numbers of each of the neighbors of the vertex.

7. The computer-implemented method of claim 1, further comprising adding the single vertex to an independent set if it is determined that one or more of the assigned predetermined plurality of random numbers of the single vertex is greater than the corresponding assigned predetermined plurality of random numbers of each of the neighbors of the single vertex.

8. The computer-implemented method of claim 7, further comprising labeling all vertices in each independent set.

9. The computer-implemented method of claim 1, wherein it is simultaneously determined whether the single vertex is a local minimum or a local maximum when compared against the Nth assigned number of each of the neighbors of the single vertex.

10. The computer-implemented method of claim 1, wherein the one of the assigned random numbers is selected from the group arbitrarily.

11. The computer-implemented method of claim 1, wherein the one of the assigned random numbers is selected from the group according to one or more predetermined criteria.

12. The computer-implemented method of claim 1, further comprising:
   adding one or more of the plurality of vertices to an independent set; and
   assigning all the vertices in an independent set the same color from a finite set of colors.

13. A non-transitory computer-readable storage medium storing instructions that, when executed by a processor, cause the processor to perform steps comprising:
   identifying a graph with a plurality of vertices;
   categorizing the plurality of vertices by:
      assigning a predetermined plurality of random numbers to each vertex of the plurality of vertices;
      determining whether each of the assigned predetermined plurality of random numbers of a single vertex is greater than a corresponding random number of the assigned predetermined plurality of random numbers of each of the neighbors of the single vertex;
      determining whether the Nth assigned number of the single vertex is a local minimum when compared against the Nth assigned number of each of the neighbors of the single vertex; and
      selecting, in response to the determination, one of the assigned random numbers from a group of assigned random numbers of the single vertex, wherein the categorizing of the plurality of vertices is optimized.

14. The non-transitory computer-readable storage medium of claim 13, further comprising:
   adding one or more of the plurality of vertices to an independent set; and
   assigning all the vertices in an independent set the same color from a finite set of colors.

15. A system, comprising:
   a processor for:
      identifying a graph with a plurality of vertices,
      categorizing the plurality of vertices by:
      assigning a predetermined plurality of random numbers to each vertex of the plurality of vertices;
      determining whether each of the assigned predetermined plurality of random numbers of a single vertex is greater than a corresponding random number of the assigned predetermined plurality of random numbers of each of the neighbors of the single vertex;
      determining whether the Nth assigned number of the single vertex is a local minimum when compared against the Nth assigned number of each of the neighbors of the single vertex; and
      selecting, in response to the determination, one of the assigned random numbers from a group of assigned random numbers of the single vertex, wherein the categorizing of the plurality of vertices is optimized.

16. The system of claim 15, wherein the processor is coupled to memory via a bus.

17. The system of claim 15, further comprising:
   adding one or more of the plurality of vertices to an independent set; and assigning all the vertices in an independent set the same color from a finite set of colors.

* * * * *